US012673837B2

(12) United States Patent
Kitahara et al.

(10) Patent No.: US 12,673,837 B2
(45) Date of Patent: Jul. 7, 2026

(54) RECORDING SYSTEM AND POST-PROCESSING DEVICE

(71) Applicant: SEIKO EPSON CORPORATION, Tokyo (JP)

(72) Inventors: Masashi Kitahara, Minamiminowa-Mura (JP); Naoki Hori, Shiojiri (JP); Tomoyuki Shiiya, Matsumoto (JP); Yoshikazu Hama, Okaya (JP)

(73) Assignee: Seiko Epson Corporation, Tokyo (JP)

(*) Notice: Subject to any disclaimer, the term of this patent is extended or adjusted under 35 U.S.C. 154(b) by 591 days.

(21) Appl. No.: 18/192,568

(22) Filed: Mar. 29, 2023

(65) Prior Publication Data

US 2024/0326474 A1 Oct. 3, 2024

(30) Foreign Application Priority Data

Mar. 30, 2022 (JP) ................................ 2022-055313

(51) Int. Cl.

*B41J 11/42* (2006.01)
*B41J 11/36* (2006.01)
*B41J 15/00* (2006.01)
*B41M 7/00* (2006.01)
*B65H 20/34* (2006.01)
*B41J 11/66* (2006.01)

(52) U.S. Cl.

CPC .............. *B65H 20/34* (2013.01); *B41J 11/36* (2013.01); *B41J 15/005* (2013.01); *B41M 7/00* (2013.01); *B41J 11/66* (2013.01); *B65H 2403/942* (2013.01)

(58) Field of Classification Search

None

See application file for complete search history.

(56) References Cited

U.S. PATENT DOCUMENTS

2010/0226704 A1* 9/2010 Kersey .................... B41J 11/66 400/611

FOREIGN PATENT DOCUMENTS

EP 3437891 A1 * 2/2019 ............ B41J 11/663
JP 4977773 B 7/2012

(Continued)

OTHER PUBLICATIONS

English language translation of WO 2007/057259 A1, publication date May 24, 2007. (Year: 2007).*

*Primary Examiner* — Leslie J Evanisko

(74) *Attorney, Agent, or Firm* — WORKMAN NYDEGGER

(57) ABSTRACT

A recording system includes a first unit configured to transport a medium that is continuous, a recording unit configured to perform recording on the medium transported by the first unit, a second unit configured to transport the medium, a post-processing unit configured to perform predetermined post-processing on the medium transported by the second unit, and a buffer provided between the first unit and the second unit, the buffer being configured to accumulate the medium transported from the first unit and feed the medium to the second unit, wherein in a recording period in which the recording unit performs the recording on the medium, the second unit transports the medium at a first velocity, and in a non-recording period that is after the recording period and in which the recording unit does not perform the recording on the medium.

9 Claims, 5 Drawing Sheets

(56) References Cited

FOREIGN PATENT DOCUMENTS

| | | | | |
|---|---|---|---|---|
| JP | 2016-64541 | A | 4/2016 | |
| WO | WO-2007057259 | A1 * | 5/2007 | ......... G03G 15/6517 |

* cited by examiner

RECORDING SYSTEM AND POST-PROCESSING DEVICE

The present application is based on, and claims priority from JP Application Serial Number 2022-055313, filed Mar. 30, 2022, the disclosure of which is hereby incorporated by reference herein in its entirety.

BACKGROUND

1. Technical Field

The present disclosure relates to a recording system and a post-processing device.

2. Related Art

A known configuration includes a recording unit performing recording on a medium such as continuous long label paper, a post-processing unit performing post-processing on the medium on which the recording has been performed, and a buffer unit provided on a transport path of the medium from the recording unit to the post-processing unit, the buffer unit temporarily accumulating the medium and controlling slack or tension of the medium.

A label generation apparatus including a laser processing device and a printing device is also disclosed (see JP-A-2016-64541). According to JP-A-2016-64541, the laser processing device is provided with a processing-end feeding mechanism, and the printing device is provided with a printing-end feeding mechanism. The processing-end feeding mechanism and the printing-end feeding mechanism constitute a medium feeding unit feeding a medium that is a long strip-shaped sheet by a roll-to-roll method. A buffer unit is provided between the laser processing device and the printing device, and the medium fed from the laser processing device is temporarily accumulated in the buffer unit.

In the above configuration in which the former stage unit, the buffer unit, and the latter stage unit are coupled by a transport path of the medium, the recording unit at the former stage may transport backward the medium on which recording is completed due to user desire or the rule of processes. The backward transporting is also referred to as back feeding. In the back feeding, the medium can be transported backward toward the upstream by a distance corresponding to the amount of the medium accumulated in the buffer unit. Because the medium flows downstream from the buffer unit, it is necessary to increase the capacity of the buffer in order to secure a sufficient distance for the back feeding. However, the increase in the capacity of the buffer causes upsizing of the device including the buffer. In view of such a problem, there is a demand for improvement that contributes to securing of the back feeding distance.

SUMMARY

A recording system includes a first transport unit configured to transport a medium that is continuous, a recording unit configured to perform recording on the medium transported by the first transport unit, a second transport unit configured to transport the medium, a post-processing unit configured to perform predetermined post-processing on the medium transported by the second transport unit, and a buffer unit provided between the first transport unit and the second transport unit, the buffer unit being configured to accumulate the medium transported from the first transport unit and feed the medium to the second transport unit, wherein in a recording period in which the recording unit performs the recording on the medium, the second transport unit transports the medium at a first transport velocity, and in a non-recording period that is after the recording period and in which the recording unit does not perform the recording on the medium, a transport velocity of the medium by the second transport unit is a second transport velocity lower than the first transport velocity.

A post-processing device receives a medium transported by a recording device and performs predetermined post-processing on the medium, the medium being continuous, the recording device being configured to perform recording on the medium, the post-processing device including a transport unit configured to transport the medium, a post-processing unit configured to perform the post-processing on the medium transported by the transport unit, and a buffer unit configured to accumulate the medium transported from the recording device and feed the medium to the transport unit, wherein in a recording period in which the recording device performs the recording on the medium, the transport unit transports the medium at a first transport velocity, and in a non-recording period that is after the recording period and in which the recording device does not perform the recording on the medium, a transport velocity of the medium by the transport unit is a second transport velocity lower than the first transport velocity.

DESCRIPTION OF EXEMPLARY EMBODIMENTS

An embodiment of the present disclosure will be described below with reference to the accompanying drawings. Note that each of the drawings is merely illustrative for describing the embodiment. Since the drawings are illustrative, proportions and shapes may not be precise or consistent, or some may be omitted.

1. Description of System Configuration

Figure 1:
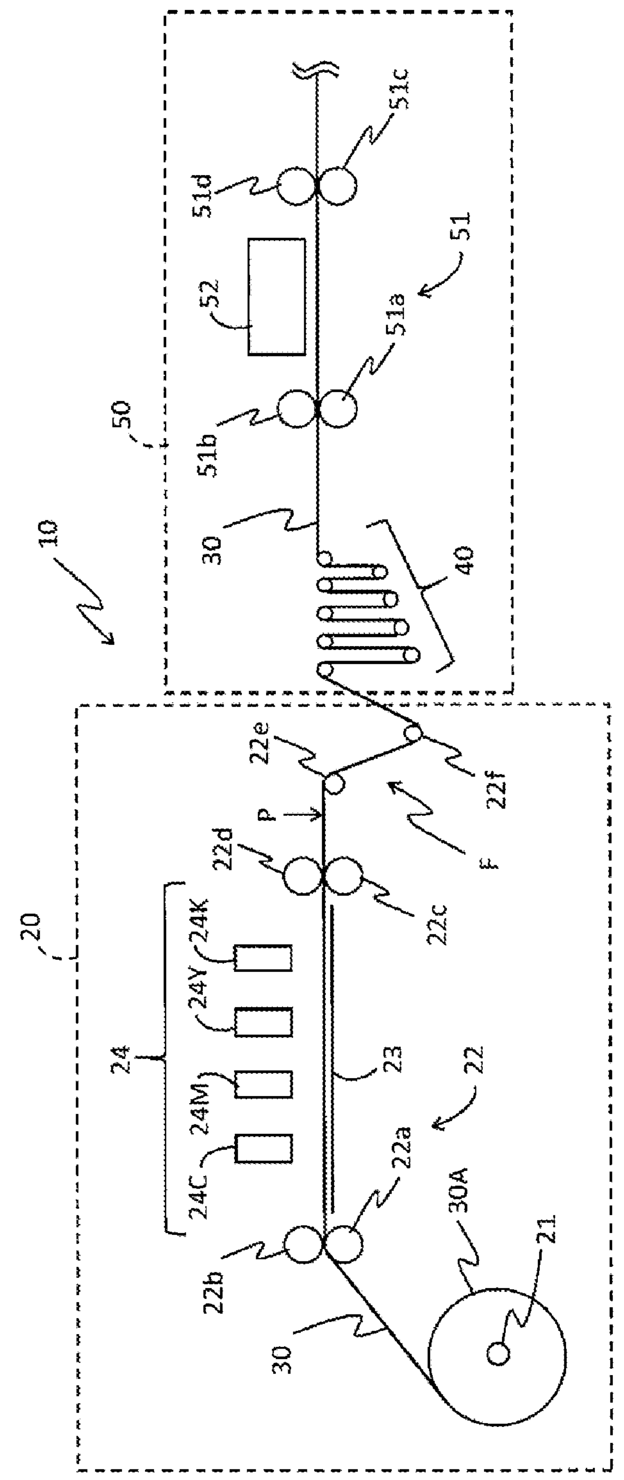
FIG. 1 is a view simply illustrating part of a configuration of a recording system.

FIG. 1 simply illustrates part of a configuration of a recording system 10 according to the embodiment viewed from a direction intersecting a transport path F of a medium 30. The recording system 10 generally includes a recording device 20 performing recording on the continuous medium 30, and a post-processing device 50 performing predetermined post-processing on the medium 30. The transport path F of the medium 30 is formed over the recording device 20 and the post-processing device 50. As described below, the transport path F is formed of a first transport unit 22, a buffer unit 40, and a second transport unit 51.

The medium 30 is, for example, a sheet and is only required to be a sheet-shaped medium on which recording can be performed. The medium 30 may be a film, fabric, or the like. Furthermore, the medium 30 may be label paper including base paper and a label attached to the base paper in a peelable manner. The recording device 20 holds a roll-type medium 30A by a delivery unit 21. The roll-type medium 30A is obtained by winding the continuous medium 30 into a roll shape. The recording device 20 rotates the roll-type medium 30A by driving the delivery unit 21 by a motor and delivers the medium 30 from the roll-type medium 30A toward the downstream of the transport path F. Hereinafter, upstream and downstream on the transport path F are simply referred to as upstream and downstream. In FIG. 1, the delivery unit 21 is located most upstream, and the post-processing device 50 is located downstream from the recording device 20. The transport basically means transport of the medium 30 from the upstream toward the downstream. However, the recording system 10 can also perform back feeding, which is feeding of the medium 30 backward from the downstream toward the upstream.

The recording device 20 includes the first transport unit 22 that transports the medium 30 delivered from the roll-type medium 30A. In an example illustrated in FIG. 1, the first transport unit 22 includes a first roller pair including a transport roller 22*a* and a driven roller 22*b*, and a second roller pair including a transport roller 22*c* and a driven roller 22*d*. Each roller pair transports the medium 30 by rotating in a state where the medium 30 is sandwiched between the rollers forming the pair. The first roller pair is disposed upstream from the second roller pair.

A platen 23 serving as a surface for supporting the transported medium 30 is disposed between the first roller pair and the second roller pair. A recording unit 24 that performs recording on the medium 30 transported by the first transport unit 22 is supported above the platen 23. The recording unit 24 is a unit for performing recording by ejecting a liquid such as ink by an ink-jet method. In the example illustrated in FIG. 1, the recording unit 24 includes recording heads 24C, 24M, 24Y, and 24K. The recording heads 24C, 24M, 24Y, and 24K each include a plurality of nozzles and can eject a dot of the liquid from each nozzle.

The recording head 24C is a recording head that ejects cyan (C) ink. The recording head 24M is a recording head that ejects magenta (M) ink, the recording head 24Y is a recording head that ejects yellow (Y) ink, and the recording head 24K is a recording head that ejects black (K) ink. The recording heads 24C, 24M, 24Y, and 24K eject the respective CMYK inks to the medium 30 transported on the platen 23, so that a color image is recorded on the medium 30. The arrangement order of the recording heads 24C, 24M, 24Y, and 24K along the transport path F does not need to be as illustrated in FIG. 1. As a matter of course, the recording unit 24 can perform recording on the medium 30 by ejecting ink other than CMYK inks or a liquid other than ink.

The first transport unit 22 may have a cylindrical rotatable drum instead of the platen 23, support the medium 30 on the circumferential surface of the drum, and transports the medium 30 on which recording is performed by the recording unit 24. The first transport unit 22 may include rollers 22*e* and 22*f* downstream from the second roller pair, and may form an additional part of the transport path F downstream from the second roller pair. The medium 30 on which recording has been performed by the recording unit 24 is guided by the rollers 22*e* and 22*f* and transported further downstream.

The medium 30 transported downstream by the first transport unit 22 is received by the post-processing device 50. The post-processing device 50 includes a second transport unit 51 that transports the medium 30, a post-processing unit 52 that performs post-processing on the medium 30 transported by the second transport unit 51, and a buffer unit 40 that can accumulate the medium 30 transported from the recording device 20 and feed the medium 30 to the second transport unit 51. That is, the buffer unit 40 is provided between the first transport unit 22 and the second transport unit 51. The second transport unit 51 transports the medium 30 accumulated in the buffer unit 40 further downstream.

In the example illustrated in FIG. 1, the second transport unit 51 includes a third roller pair including a transport roller 51*a* and a driven roller 51*b*, and a fourth roller pair including a transport roller 51*c* and a driven roller 51*d*. The third roller pair is disposed upstream from the fourth roller pair. A post-processing unit 52 is disposed between the third roller pair and the fourth roller pair.

Needless to say, the arrangement and the number of the rollers included in each of the first transport unit 22 and the second transport unit 51, and the form of the transport path F guided by these units do not need to be as illustrated in FIG. 1.

A wide variety of the post-processing units 52 is assumed in the embodiment. Several specific examples of the post-processing will be described below.

Examples of the post-processing performed by the post-processing unit 52 include recording processing of performing second recording on the medium 30 on which recording has been performed by the recording unit 24. In this case, the post-processing unit 52 is a unit for performing recording or printing. As second recording, the post-processing unit 52, for example, prints a protective film on the image on the medium 30 recorded by the recording unit 24 or performs printing for decoration on the image using a special recording agent. As the second recording, the post-processing unit 52 may attach gold foil to the medium 30 after recording by the recording unit 24.

The post-processing performed by the post-processing unit 52 is, for example, inspection processing of reading, by a reading unit, the medium 30 on which recording has been performed by the recording unit 24 to inspect the medium. In this case, the post-processing unit 52 also serves as the reading unit such as a scanner, a camera, or a colorimeter, reads the image on the medium 30 recorded by the recording unit 24, and can perform various inspections regarding color, brightness, inclination, misalignment, character quality, and the others based on the reading result. The post-processing unit 52 may display such inspection results on a predetermined display and cause the user to visually recognize the results.

The post-processing performed by the post-processing unit 52 is, for example, cutting processing of cutting the medium 30 on which recording has been performed by the recording unit 24. In this case, the post-processing unit 52 is a cutter movable relative to the medium 30 and cuts the medium 30 for each necessary unit, for example, for each image recorded on the medium 30, each set of a plurality of the images, or each page. In addition, the cutting processing may be not only processing of dividing the medium 30 by the cutter, but also processing of cutting a slit in the medium 30 so as to facilitate subsequent dividing. In addition, when the medium 30 is label paper, the cutting processing may be processing of cutting a label on which an image has been recorded into a specific shape without cutting base paper.

The post-processing performed by the post-processing unit 52 is, for example, heating processing of heating the medium 30 on which recording has been performed by the recording unit 24. In this case, the post-processing unit 52 is a heater and heats the medium 30. The heating is, for example, heating for drying ink. Furthermore, the post-processing unit 52 may be a unit for heating a predetermined material and crimping the material on the medium 30 in order to perform laminate processing on the medium 30.

In addition, various types of processing such as processing of forming a punch hole in the medium 30, stitching processing by a stapler, and bending processing can be considered as the post-processing performed by the post-processing unit 52.

A part of the medium 30 on which the post-processing has been performed by the post-processing unit 52 is transported further downstream by the transport roller 51*c*. In FIG. 1, the transport path F downstream from the transport roller 51*c* is omitted.

2. Description of Buffer Unit 40

Figure 2:
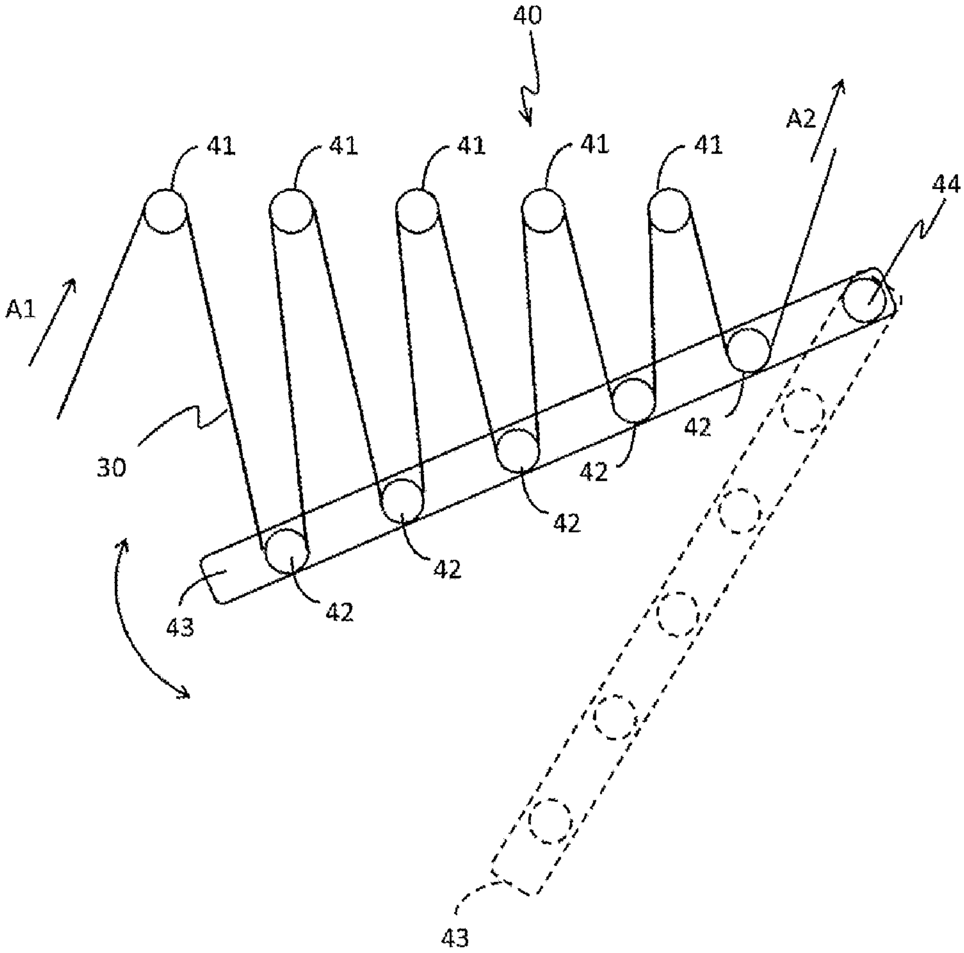
FIG. 2 is a view illustrating an example of a buffer unit.

FIG. 2 illustrates an example of the buffer unit 40. The buffer unit 40 includes a plurality of fixed rollers 41 and a dancer roller 43. The plurality of fixed rollers 41 are arranged at intervals on a straight line. Each fixed roller is rotatable at a fixed position. The dancer roller 43 includes a plurality of moving rollers 42 arranged at intervals on a straight line. Each moving roller is rotatable. The whole dancer roller 43 is rotatable about a shaft 44 at one end. In FIG. 2, the dancer roller 43 when furthest away from the fixed rollers 41 is illustrated by a dashed line. When the dancer roller 43 is furthest away from the fixed rollers 41, the buffer unit 40 accumulates the medium 30 using the whole capacity.

A direction A1 indicates a direction in which the medium 30 is transported from the first transport unit 22 to the buffer unit 40, and a direction A2 indicates a direction in which the medium 30 is fed from the buffer unit 40 to the second transport unit 51. Note that the buffer unit 40 itself has no ability to move the medium 30, and thus moving of the medium 30 downstream from the buffer unit 40 by a transport force of the second transport unit 51 is expressed as feeding of the medium 30 from the buffer unit 40 to the second transport unit 51. As illustrated in FIG. 2, the medium 30 is alternately wound on the fixed rollers 41 and the moving rollers 42. When the transport amount of the medium 30 by the first transport unit 22 per unit time is greater than the transport amount of the medium 30 by the second transport unit 51 per unit time, the dancer roller 43 rotates in a direction away from the fixed rollers 41 in accordance with an increase in the accumulation amount of the medium 30 in the buffer unit 40.

In contrast, when the transport amount of the medium 30 by the first transport unit 22 per unit time is less than the transport amount of the medium 30 by the second transport unit 51 per unit time, the dancer roller 43 rotates in a direction toward the fixed rollers 41 in accordance with a decrease in the accumulation amount of the medium 30 in the buffer unit 40. The buffer unit 40 is only required to include a dancer roller movable in accordance with an increase or decrease in the accumulation amount of the medium 30 and is not limited to the configuration illustrated in FIG. 2.

3. Description of Control System

Figure 3:
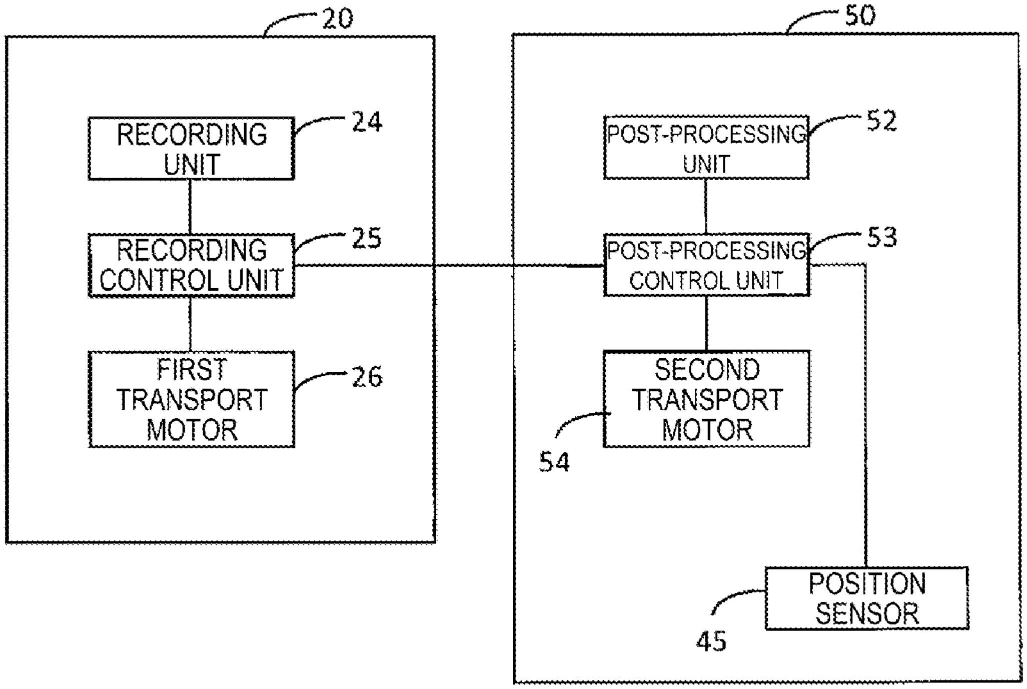
FIG. 3 is a block diagram simply illustrating a configuration of a control system of each of a recording device and a post-processing device.

FIG. 3 is a block diagram simply illustrating a configuration of mainly a control system of each of the recording device 20 and the post-processing device 50. The recording device 20 includes a recording control unit 25 and a first transport motor 26. The first transport motor 26 is a power source of the first transport unit 22, and, referring to FIG. 1, drives the delivery unit 21, the transport roller 22*a*, and the transport roller 22*c*. The recording control unit 25 is a controller of the recording device 20, and includes a processor, a memory, a program stored in the memory, and the like. The processor performs processing according to the program. The recording control unit 25 controls recording by the recording unit 24 to record an image on the medium 30. In addition, the recording control unit 25 controls the rotational velocity and the rotational position of the first transport motor 26 to transport the medium 30 by the first transport unit 22.

The post-processing device 50 includes a post-processing control unit 53, a second transport motor 54, and a position sensor 45. The second transport motor 54 is a power source of the second transport unit 51, and, referring to FIG. 1, drives the transport roller 51*a* and the transport roller 51*c*. The post-processing control unit 53 is a controller of the post-processing device 50 and includes a processor, a memory, a program stored in the memory, and the like. The post-processing control unit 53 controls the post-processing unit 52 to perform post-processing on the medium 30. In addition, the post-processing control unit 53 controls the rotational velocity and the rotational position of the second transport motor 54 to transport the medium 30 by the second transport unit 51. Of course, the transport of the medium 30 by the second transport unit 51 is transport necessary for post-processing performed by the post-processing unit 52. Thus, examples of the transport include continuous transport, intermittent transport of repeating transport and stop, and an operation of temporarily performing back feeding but consequently transporting the medium downstream.

The position sensor 45 detects the position of the dancer roller 43 that rotates about the shaft 44 (hereinafter, referred to as a dancer roller position), and outputs a detection result of the dancer roller position to the post-processing control unit 53. The post-processing control unit 53 can perform a "first control mode" of controlling the second transport unit 51 in accordance with the detection result of the dancer roller position from the position sensor 45. The post-processing control unit 53 also can perform a "second control mode" different from the first control mode as control of the second transport unit 51.

Although not illustrated, the recording system 10 suitably has a typical configuration such as a user interface for receiving an operation from the user, a display for displaying visual information, and a communication interface for communicating with an external device.

Figure 4:
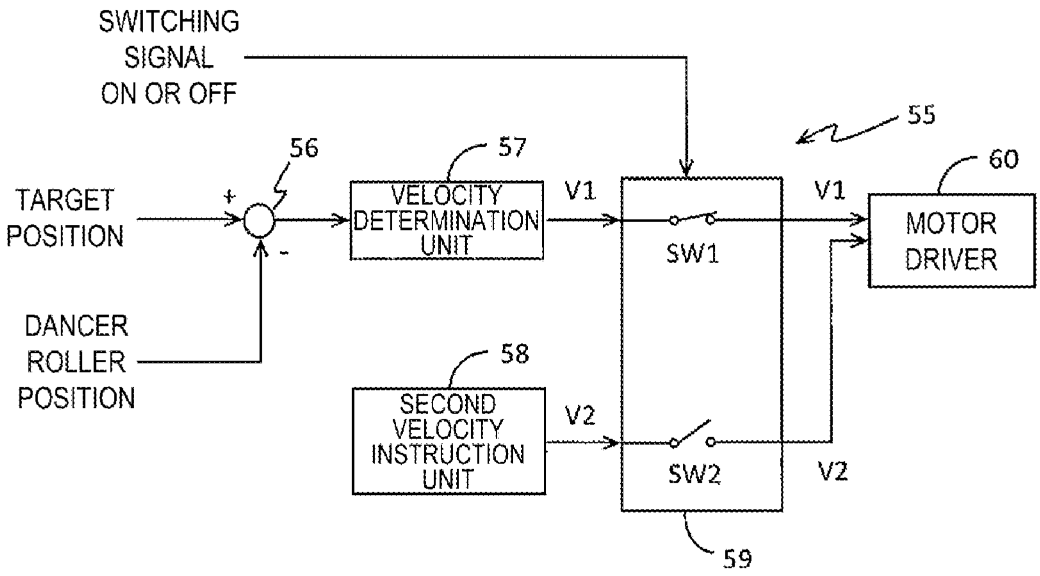
FIG. 4 is a circuit diagram for describing a first control mode and a second control mode.

FIG. 4 is a circuit diagram for describing the first control mode and the second control mode and illustrates a velocity control circuit 55. The velocity control circuit 55 may be understood as part of the post-processing control unit 53. The velocity control circuit 55 includes a subtractor 56, a velocity determination unit 57, a second velocity instruction unit 58, a switching unit 59, and a motor driver 60. The post-processing control unit 53 inputs a target position of the dancer roller 43 to the subtractor 56. The target position is, for example, an intermediate position between a position where the dancer roller 43 is closest to the fixed rollers 41 and a position where the dancer roller 43 is furthest away from the fixed rollers 41. The dancer roller 43 indicated by a solid line in FIG. 2 is substantially at the intermediate position.

In addition, the dancer roller position, which is a detection result by the position sensor 45, is input to the subtractor 56. The subtractor 56 inputs a positional deviation, which is the difference between the target position and the dancer roller position, to the velocity determination unit 57. The velocity determination unit 57 determines a transport velocity V1 of the second transport unit 51 in accordance with the input positional deviation, and outputs the transport velocity V1 to the switching unit 59. The velocity determination unit 57 determines the transport velocity V1 in accordance with the input positional deviation with reference to, for example, a velocity profile defining, in advance, a correspondence relationship between the positional deviation and the transport velocity V1. Thus, the transport velocity V1 is not constant.

Generally, when the dancer roller position is closer to the fixed rollers 41 than the target position is, the velocity determination unit 57 decreases the transport velocity V1 so as to increase the accumulation amount of the medium 30 in the buffer unit 40. On the other hand, when the dancer roller position is further away from the fixed rollers 41 than the target position is, the velocity determination unit 57 increases the transport velocity V1 so as to decrease the accumulation amount of the media 30 in the buffer unit 40. In the first control mode, by determining the transport velocity V1 in accordance with the positional deviation in this manner, the dancer roller position is stabilized so that the dancer roller position is at or near the target position. Stabilizing the dancer roller position near the target position prevents the medium 30 from being slackened or being subjected to an excessive tension in the buffer unit 40.

As described above, the transport of the medium 30 by the second transport unit 51 for the post-processing may be intermittent transport or may include back feeding. Accordingly, the transport velocity V1 may be understood as a velocity for transporting, by the second transport unit 51, the medium 30 from the upstream toward the downstream. The transport velocity V1 corresponds to a "first transport velocity".

The switching unit 59 receives the transport velocity V1 from the velocity determination unit 57 and receives a predetermined transport velocity V2 from the second velocity instruction unit 58. The transport velocity V2 corresponds to a "second transport velocity". In the embodiment, the transport velocity V1 is higher than the transport velocity V2. The transport velocity V1 determined by the velocity determination unit 57 is not constant, but the transport velocity V2 is set to be lower than the minimum value in a range of the transport velocity V1 that can be determined by the velocity determination unit 57. Here, the transport velocity V2 is zero.

The switching unit 59 includes switches SW1 and SW2 and outputs one of the transport velocities V1 and V2 to the motor driver 60. The switching unit 59 outputs the transport velocity V1 to the motor driver 60 by turning on the switch SW1 and outputs the transport velocity V2 to the motor driver 60 by turning on the switch SW2. The switching unit 59 receives a switching signal transmitted from the recording control unit 25 of the recording device 20. Here, when the switching signal is OFF, the switching unit 59 turns on the switch SW1 and turns off the switch SW2. On the other hand, when the switching signal is ON, the switching unit 59 turns off the switch SW1 and turns on the switch SW2.

The motor driver 60 receives the transport velocity from the switching unit 59 and sets the rotational velocity of the second transport motor 54 to the received transport velocity. The second transport motor 54 is a DC motor. The motor driver 60 controls the rotational velocity of the second transport motor 54, that is, the transport velocity of the second transport unit 51 by supplying, to the second transport motor 54, a drive signal pulse-width modulated in accordance with the received transport velocity. Accordingly, the first control mode is a mode in which the transport velocity V1 is input to the motor driver 60 and the transport velocity of the second transport unit 51 is set to the transport velocity V1. On the other hand, the second control mode is a mode in which the transport velocity V2 is input to the motor driver 60 and the transport velocity of the second transport unit 51 is set to the transport velocity V2.

Since the transport velocity V2 is zero, the transport of the second transport unit 51 is stopped in the second control mode. Unlike the first control mode, the control of stabilizing the dancer roller position at the target position does not function in the second control mode, and the dancer roller 43 simply moves according to the transport of the medium 30 by the first transport unit 22. With such a configuration, by switching ON/OFF of the switching signal to be transmitted to the switching unit 59, the recording control unit 25 can switch the control of the second transport unit 51 in the post-processing device 50 from the first control mode to the second control mode or from the second control mode to the first control mode.

4. Relationship Between Recording and Control Modes

Next, the relationship between recording by the recording unit 24 and the first and second control modes will be described. In the recording system 10, in a "recording period" in which the recording unit 24 performs recording on the medium 30, the second transport unit 51 transports the medium 30 at the transport velocity V1, and in a "non-recording period" that is after the recording period and in which the recording unit 24 does not perform the recording on the medium 30, the transport velocity of the medium 30 by the second transport unit 51 is the transport velocity V2.

Figure 5:
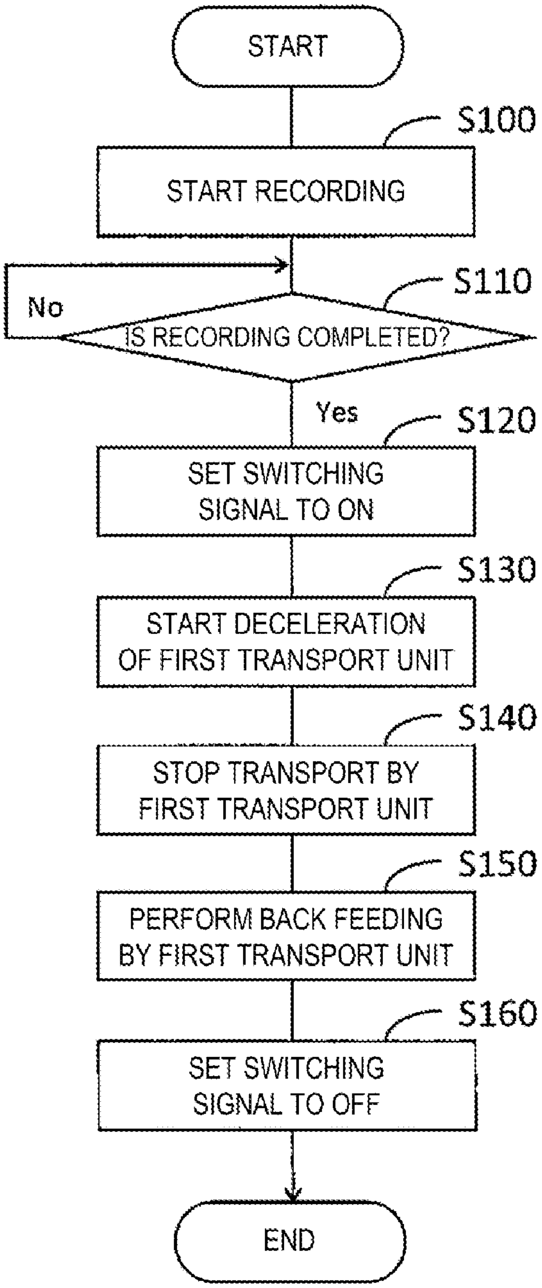
FIG. 5 is a flowchart illustrating mode switching control processing performed by the recording device.

FIG. 5 is a flowchart illustrating mode switching control processing performed by the recording control unit 25 in accordance with the program.

In step S100, the recording control unit 25 starts recording on the medium 30. That is, the recording control unit 25 drives the first transport motor 26 to start transporting the medium 30 by the first transport unit 22, and causes the recording unit 24 to perform recording on the medium 30 by ejecting ink or the like. In the embodiment, what contents are recorded by the recording device 20 is not limited. The recording control unit 25 is only required to control the recording unit 24 and the first transport unit 22 so as to repeatedly record, on the transported medium 30, an image in units of pages freely specified by the user, in units of one label, or in units of a set of a plurality of labels.

The recording control unit 25 repeatedly determines whether the recording is completed after starting the recording in step S100 (step S110). The recording control unit 25 determines "Yes" in step S110 when the recording of the number of units specified in advance by the user is completed, and proceeds to step S120. The number of units here is, for example, the number of units when one page, one label, or one set of a plurality of labels is defined as one unit. However, the meaning of one unit is not particularly limited. The recording control unit 25 may determine "Yes" in step S110 when the user instructs completion of the recording. In any case, it is only required that the recording control unit 25 determine that the recording is completed.

The recording period is a period from when step S100 starts to when "Yes" is determined in step S110. The non-recording period is a period from when "Yes" is determined in step S110 to when the recording device 20 starts next recording.

In step S120, the recording control unit 25 switches the switching signal to be output to the switching unit 59 from OFF to ON. Before determining "Yes" in step S110, the recording control unit 25 sets the switching signal to OFF. As a result of step S120, the post-processing control unit 53 switches the control of the second transport unit 51 to the second control mode from the first control mode in the recording period until that time. In the second control mode, the transport velocity V2 is employed, and the transport of the medium 30 by the second transport unit 51 is stopped. In this manner, the first control mode is switched to the second control mode at the timing when the recording period is switched to the non-recording period. Note that when the transport of the medium 30 by the second transport unit 51 is stopped, the post-processing control unit 53 temporarily stops the post-processing by the post-processing unit 52 upon this stop.

In step S130, the recording control unit 25 starts decelerating the first transport unit 22 to stop the transport of the medium 30 by the first transport unit 22. That is, the recording control unit 25 decelerates the first transport motor 26 to reduce the rotational velocity to zero. As a result of step S130, the transport by the first transport unit 22 is stopped (step S140). It takes some time from step S130 to step S140. Accordingly, the position of the medium 30 on which the recording of the image by the recording unit 24 is completed at last (hereinafter, referred to as a recording completion position) is transported downstream until the transport by the first transport unit 22 is completely stopped in step S140.

In step S150, the recording control unit 25 controls the first transport motor 26 to cause the first transport unit 22 to back-feed the medium 30. For example, the recording control unit 25 causes the first transport unit 22 to back-feed the medium 30 until the recording completion position returns to a predetermined check position P on the transport path F. In the example illustrated in FIG. 1, the check position P is set downstream from the transport roller 22*c* and upstream from the roller 22*e*. Whether the recording completion position has returned to the check position may be detected by a sensor (not illustrated), or the user may notify the recording control unit 25.

The user can visually recognize an image at the recording completion position that has returned to the check position P or an image in the vicinity thereof, evaluates the recording result of the image, and performs adjustment or setting regarding the recording by the recording device 20 if necessary. When the switching signal is set to ON in step S120, the second transport unit 51 is stopped. Thus, the medium 30 accumulated in the buffer unit 40 does not flow downstream, and the medium 30 corresponding to the distance transported by the first transport unit 22 during the deceleration period from when the first transport unit 22 starts deceleration in step S130 to when the first transport unit 22 completely stops (step s140) is wholly accumulated in the buffer unit 40. Thus, at the time of performing step S150, the medium 30 required for back feeding is accumulated in the buffer unit 40, and the medium 30 can be surely back-fed to the check position P.

In step S160, the recording control unit 25 switches the switching signal to be output to the switching unit 59 from ON to OFF, and terminates the flowchart of FIG. 5. As a result, the post-processing control unit 53 switches the control of the second transport unit 51 from the second control mode to the first control mode. Accordingly, the post-processing control unit 53 can restart transporting the medium 30 by the second transport unit 51 at the transport velocity V1, and restart post-processing by the post-processing unit 52 on the remaining image on the medium 30 and the vicinity thereof. In such a description, setting the transport velocity of the second transport unit 51 to the transport velocity V2 in the non-recording period does not necessarily mean setting the transport velocity of the second transport unit 51 to the transport velocity V2 in the whole of the non-recording period.

5. Summary

In this manner, according to the embodiment, the recording system 10 includes the first transport unit 22 configured to transport the medium 30 that is continuous, the recording unit 24 configured to perform recording on the medium 30 transported by the first transport unit 22, the second transport unit 51 configured to transport the medium 30, the post-processing unit 52 configured to perform predetermined post-processing on the medium 30 transported by the second transport unit 51, and the buffer unit 40 provided between the first transport unit 22 and the second transport unit 51, the buffer unit 40 being configured to accumulate the medium 30 transported from the first transport unit 22 and feed the medium 30 to the second transport unit 51. Then, in the recording period in which the recording unit 24 performs the recording on the medium 30, the second transport unit 51 transports the medium 30 at the first transport velocity, and in the non-recording period that is after the recording period and in which the recording unit 24 does not perform the recording on the medium 30, the transport velocity of the medium 30 by the second transport unit 51 is the second transport velocity lower than the first transport velocity.

According to the configuration, when the recording period is switched to the non-recording period, the transport velocity of the second transport unit 51 decreases from the first transport velocity to the second transport velocity. Thus, the accumulation amount of the medium 30 in the buffer unit 40 increases in the non-recording period as compared to the recording period. Thus, assuming that the first transport unit 22 back-feeds the medium 30 stopped in the non-recording period, a necessary amount of the medium 30 for the back feeding is easily accumulated in the buffer unit 40. That is, by increasing the accumulation amount within the capacity of the buffer unit 40, it is possible to appropriately perform back feeding without increasing the capacity itself of the buffer unit 40, and to avoid upsizing of the device including the buffer unit 40.

If the post-processing device 50 remains in the first control mode even in the non-recording period, the dancer roller 43 attempts to be maintained at the target position being the intermediate position. Thus, only approximately half of the capacity of the buffer unit 40 can be used for accumulation of the medium 30. Thus, the capacity itself of the buffer unit 40 needs to be increased in order to have a more accumulation amount, but in the embodiment, switching from the first control mode to the second control mode eliminates such a necessity.

In addition, according to the embodiment, the second transport velocity may be zero.

According to the configuration, when the recording period is switched to the non-recording period, the transport by the second transport unit 51 is stopped, and the medium 30 corresponding to the distance transported until the first transport unit 22 is stopped during the non-recording period is wholly accumulated in the buffer unit 40. Thus, a necessary amount of the medium 30 for the back feeding is surely accumulated in the buffer unit 40.

However, the second transport velocity is not limited to zero. The second transport velocity may be a constant value that is lower than the minimum value in a possible velocity range of the first transport velocity and that is not zero. When the second transport velocity is not zero and is surely lower than the first transport velocity, the effect of increasing the accumulation amount of the medium 30 in the buffer unit 40 in the non-recording period is exerted.

According to the embodiment, the post-processing is, for example, recording processing of performing second recording on the medium 30 on which the recording has been performed by the recording unit 24.

Alternatively, the post-processing is, for example, inspection processing of reading, by a reading unit, the medium 30 on which the recording has been performed by the recording unit 24 and inspecting the medium 30.

Alternatively, the post-processing is, for example, cutting processing of cutting the medium 30 on which the recording has been performed by the recording unit 24.

Alternatively, the post-processing is, for example, heating processing of heating the medium 30 on which the recording has been performed by the recording unit 24.

That is, the embodiment can be applied to a configuration for performing various types of post-processing.

The embodiment is not limited to the recording system 10 and discloses various categories of the invention such as each device constituting the system, a method including steps performed by the system or each device, and a program for causing a processor to perform the method.

For example, the post-processing device 50 receives the medium 30 transported by the recording device 20 and performs predetermined post-processing on the medium 30, the medium 30 being continuous, the recording device 20 being configured to perform recording on the medium 30, the post-processing device 30 including the second transport unit 51 being a transport unit configured to transport the medium 30, the post-processing unit 52 configured to perform the post-processing on the medium 30 transported by the transport unit, and the buffer unit 40 configured to accumulate the medium 30 transported from the recording device 20 and feed the medium 30 to the transport unit, wherein, in the recording period in which the recording device 20 performs the recording on the medium 30, the transport unit transports the medium 30 at the first transport velocity, and in the non-recording period that is after the recording period and in which the recording device 20 does not perform the recording on the medium 30, the transport velocity of the medium 30 by the transport unit is the second transport velocity lower than the first transport velocity.

The recording unit 24 is only required to be a unit capable of performing recording on the medium 30. The recording unit 24 includes, for example, a carriage that is provided with the recording heads 24C, 24M, 24Y, and 24K and that is movable parallel to the surface of the medium 30. The recording device 20 may perform the recording by ejecting ink from the recording heads 24C, 24M, 24Y, and 24K to the medium 30 the transport of which by the first transport unit 22 is temporarily stopped, while the carriage is moved relative to the medium 30. The recording method employed by the recording unit 24 is not limited to an ink-jet method. The recording unit 24 may employ, for example, electrophotography of performing recording by attaching toner to the medium 30.

What is claimed is:

1. A recording system comprising:

a first transport unit configured to transport a medium that is continuous;

a recording unit configured to perform recording on the medium transported by the first transport unit;

a second transport unit configured to transport the medium;

a post-processing unit configured to perform predetermined post-processing on the medium transported by the second transport unit;

a buffer unit provided between the first transport unit and the second transport unit, the buffer unit being configured to accumulate the medium transported from the first transport unit and feed the medium to the second transport unit, wherein the post-processing unit comprises a velocity control unit, in a recording period in which the recording unit performs the recording on the medium, the velocity control unit controls the second transport unit to transport the medium at a first transport velocity, and in a non-recording period that is after the recording period and in which the recording unit does not perform the recording on the medium, the velocity control unit controls the second transport unit to transport the medium at a second transport velocity lower than the first transport velocity.

2. The recording system according to claim 1, wherein the second transport velocity is zero.

3. The recording system according to claim 1, wherein the post-processing is recording processing of performing second recording on the medium on which the recording is performed by the recording unit.

4. The recording system according to claim 1, wherein the post-processing is inspection processing of reading, by a reading unit, the medium on which the recording is performed by the recording unit and inspecting the medium.

5. The recording system according to claim 1, wherein the post-processing is cutting processing of cutting the medium on which the recording is performed by the recording unit.

6. The recording system according to claim 1, wherein the post-processing is heating processing of heating the medium on which the recording is performed by the recording unit.

7. The recording system according to claim 1, wherein the first transport unit back-feeds the medium until a recording completion position, which is a position of the medium on which the recording by the recording unit is completed, returns to a check position on a transport path of the medium.

8. A post-processing device that receives a medium transported by a recording device and that performs predetermined post-processing on the medium, the medium being continuous, the recording device being configured to perform recording on the medium, the post-processing device comprising:

a transport unit configured to transport the medium;

a post-processing unit configured to perform the post-processing on the medium transported by the transport unit; and a buffer unit configured to accumulate the medium transported from the recording device and feed the medium to the transport unit, wherein the post-processing unit comprises a velocity control unit, in a recording period in which the recording device performs the recording on the medium, the velocity control unit controls the transport unit to transport the medium at a first transport velocity, and in a non-recording period that is after the recording period and in which the recording device does not perform the recording on the medium, the velocity control unit controls the transport unit to transport the medium at a second transport velocity lower than the first transport velocity.

9. A recording system comprising:

a first transport unit configured to transport a medium that is continuous;

a recording unit configured to perform recording on the medium transported by the first transport unit;

a second transport unit configured to transport the medium;

a post-processing unit configured to perform predetermined post-processing on the medium transported by the second transport unit;

a buffer unit provided between the first transport unit and the second transport unit, the buffer unit being configured to accumulate the medium transported from the first transport unit and feed the medium to the second transport unit, wherein in a recording period in which the recording unit performs the recording on the medium, the post-processing unit controls the second transport unit to transport the medium at a first transport velocity by controlling a rotational speed of a drive motor for the second transport unit, and in a non-recording period that is after the recording period and in which the recording unit does not perform the recording on the medium, the post-processing unit controls the second transport unit to transport the medium at a second transport velocity lower than the first transport velocity by controlling the rotational speed of the drive motor for the second transport unit.

* * * * *